United States Patent Office 3,248,308
Patented Apr. 26, 1966

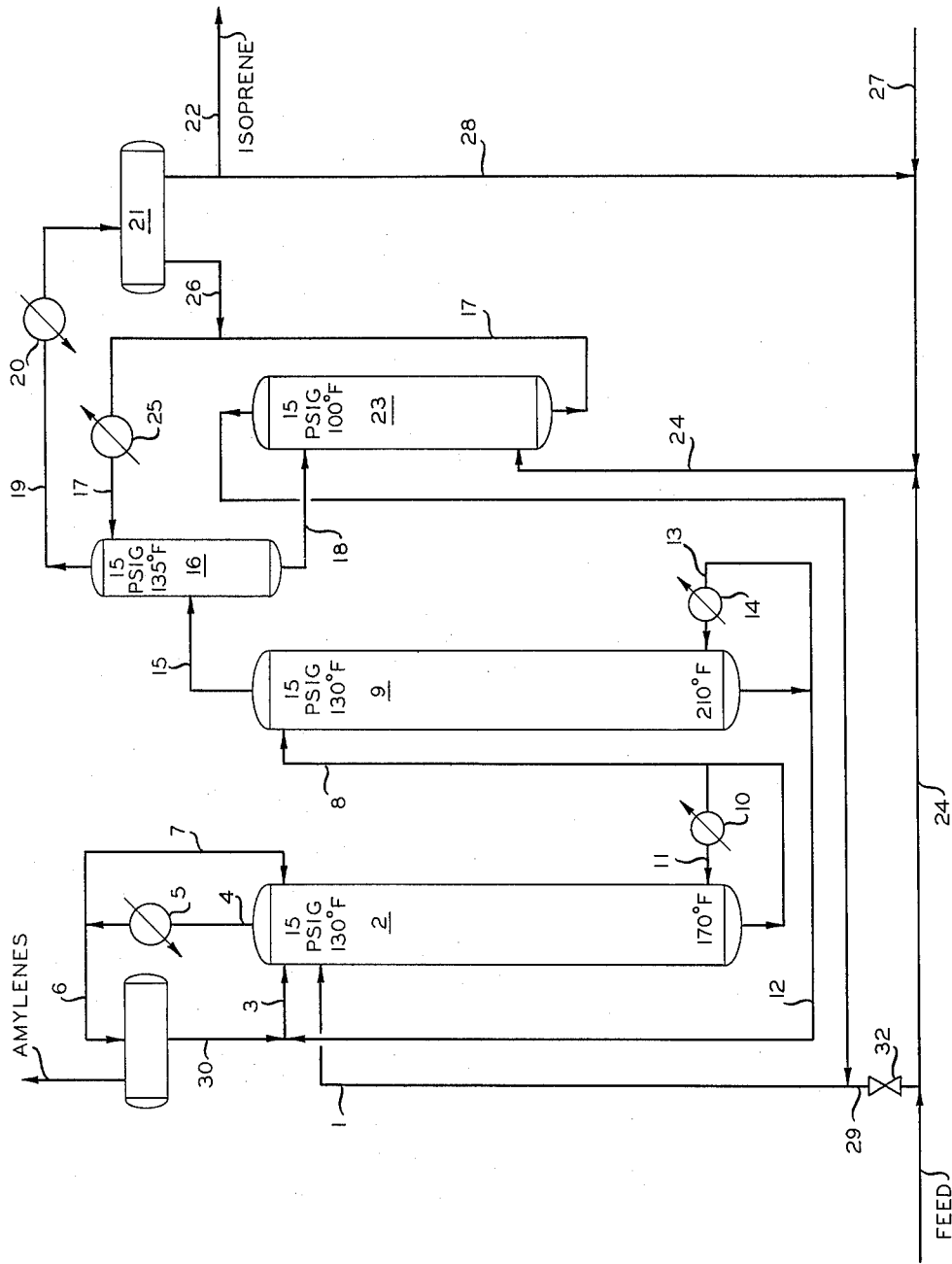

3,248,308
ISOPRENE PURIFICATION BY EXTRACTIVE DISTILLATION WITH ACETONITRILE AND RECOVERY OF ACETONITRILE THUS USED
Donald M. Haskell, Bartlesville, Okla., assignor to Phillips Petroleum Company, a corporation of Delaware
Filed Oct. 30, 1962, Ser. No. 234,192
4 Claims. (Cl. 203—43)

This invention relates to the purification of isoprene. More particularly it relates to the purification of isoprene with acetonitrile and the recovery of acetonitrile thus used. In one of its aspects the invention relates to the extraction of acetonitrile from a water solution which comprises contacting the water containing the acetonitrile with a hydrocarbon liquid in which the acetonitrile is preferentially soluble under conditions of extraction. In another of its aspects the invention relates to an operation wherein isoprene is recovered from an amylenes-containing stream by contacting said stream with acetonitrile, isoprene vapor is stripped from the acetonitrile solvent together with unavoidably vaporized acetonitrile, the acetonitrile is washed from the isoprene with water, the acetonitrile is recovered from the wash water by contacting the wash water under extraction conditions with a hydrocarbon which preferentially removes the acetonitrile from the wash water, and then recovering the acetonitrile from the said hydrocarbon. In another of its aspects the invention relates to an operation as herein described wherein the hydrocarbon used for the recovery of the acetonitrile from the wash water is a portion of the isoprene-containing feed to the operation, and the said portion together with the recovered acetonitrile is fed to the operation. In still another of its aspects the invention relates to an operation as herein described wherein a portion of the isoprene product is used to recover the acetonitrile from the water solution of it which is obtained during the said operation.

In the process for the purification of isoprene by extractive distillation with acetonitrile a considerable amount of acetonitrile is obtained overhead in the stripper column wherein the isoprene is stripped from the acetonitrile-water solution or solvent. This acetonitrile can be recovered by water washing the vapor, but there is obtained a considerable amount of water solution from which the recovery of the acetonitrile presents a problem. Furthermore, the recovery of the acetonitrile by water washing of the said vapor requires a tremendous quantity of water since the distribution ratio between vapor and water of the acetonitrile is about 1:1 by weight. Azeotropic distillation to recover the acetonitrile from the water is quite expensive because of utility costs.

It has now been conceived that the wash water might be contacted with a hydrocarbon such as the hydrocarbon feed to the distillation column to recover the acetonitrile with a minimum of cost. It is found that in the liquid phase the distribution ratio for acetonitrile is quite high in favor of the hydrocarbon phase over the water phase. Thus, advantageously, a small liquid-liquid extraction column or zone will effect the recovery of the acetonitrile in good manner. It is then possible to introduce the hydrocarbon phase from the liquid-liquid column directly to the extractive distillation column. It is further possible to recover the water phase, with consequent savings, and to recycle the same to the water washing column for further recovery of further quantities of acetonitrile.

It is an object of this invention to provide an improved process for the purification of isoprene. It is also an object of this invention to provide a process for the recovery of acetonitrile which is unavoidably obtained in the vapor phase with isoprene when isoprene has been recovered from an amylenes-containing stream by extractive distillation wih an acetonitrile-water solution. It is a further object of this invention to provide a water wash recovery of acetonitrile from isoprene vapors containing the same wherein the acetonitrile is more effectively recovered from the water which has been used for the washing. It is a further object of this invention to reduce the size of the equipment which is required to recover acetonitrile and water from an acetonitrile-water solution obtained when recovering acetonitrile unavoidably entrained together with isoprene vapors in the recovery of isoprene by extractive distillation with acetonitrile.

Other aspects, objects and the several advantages of the invention are apparent from a study of this disclosure, the drawing and the appended claims to the invention.

According to the present invention acetonitrile is extracted from water in which it is contained by contacting the water containing the acetonitrile with a liquid hydrocarbon in which the acetonitrile is preferentially soluble. Further, according to the invention the hydrocarbon which is employed can be the hydrocarbon which is to be treated with acetonitrile to recover a fraction thereof. Still further, according to the invention a purified hydrocarbon, say isoprene, which has been recovered can be in part used for purposes of recovering the acetonitrile from the wash water.

Referring now to the drawing, an amylenes feed containing isoprene is fed by 1 into extractive distillation tower 2 to which is fed by 3, an acetonitrile solution which extracts, in column 2, isoprene from the amylenes, the remainder of which pass overhead by 4 through cooler-condenser 5 and from the operation by 6, except for a reflux amount which passes by 7 into top of tower 2. Bottoms from 2 pass by 8 into stripping column 9, heat is supplied to tower 2 by cycling a portion of the bottoms by way of heat exchanger 10 and 11. In column 9, isoprene is removed from the acetonitrile solution which is passed by 12 and 3 into column 2 for reuse. A portion of the bottoms of column 9 are cycled by 13 and heat exchanger 14 back to column 9 to heat the bottom thereof. Overhead from column 9 contains isoprene and unavoidable vaporized acetonitrile and is taken by 15 into water scrubber 16, in which wash water, introduced by 17, removes the acetonitrile from the vapors yielding a bottoms stream 18 containing essentially water and acetonitrile. Overhead from 16 constitutes purified isoprene and passes by 19 and cooler-condenser 20 into receiver and separator 21 and 22 from the operation. Bottoms 18 from water-scrubber 16 pass to acetonitrile-recovery column 23 wherein the water-acetonitrile solution is stripped of acetonitrile by extracting acetonitrile therefrom with the aid of the amylenes feed introduced by 24. Stripped water is withdrawn from 23 by 17 and passed, as described, into water-scrubber 16. If desired, the washed water temperature is adjusted in heat exchanger 25. Water vapor unavoidably entrained from 16 by stream 19 is removed from the foot of receiver and separator 21 and returned to the operation by way of 26.

Acetonitrile carried overhead in the amylenes stream 6 from column 2 may also be recovered by water scrubbing followed by hydrocarbon extraction of the aqueous extract as previously described for the recovery of acetonitrile from isoprene stream 15. The aqueous extract in this event is advantageously passed (not shown in figure) to column 23 for the hydrocarbon extraction step. The figure shows recovery of the acetonitrile from isoprene by other means, for example, distillation.

If desired, it is within the scope of the invention to employ an extraneous extractant in column 23, in which event some or all of the extractive employed in 23 can be introduced by 27 and passed by 24 to column 23. Or, at least a portion of the extractant passed to column 23 can be made up of isoprene product passed by 28 to 27 and by 24 to 23. Presently, it is preferred to use at least a portion of the feed in column 23, and, generally, as much of the feed will be used in column 23 as will there effect the operation of extracting the acetonitrile. In the event not all of the feed is used in 23, some or all thereof can be passed by 29 and 1 into column 2, in which event, valve 32 will be at least partly open.

In further detail and exemplary of the operation of this process is the following tabulation which gives the stream compositions in terms of pounds per hour in the various parts of the figure.

acetonitrile of an isoprene-containing material, washing the fraction thus obtained with water to remove acetonitrile from isoprene and recovering the acetonitrile from wash water by extraction with a liquid hydrocarbon, in which the acetonitrile is preferentially soluble, in one form of the invention, said liquid hydrocarbon being an isoprene-containing material or stream, as herein described.

I claim:

1. The recovery of isoprene from an amylenes-containing hydrocarbon first stream which comprises contacting said first stream with acetonitrile under conditions of extractive distillation to obtain an amylenes containing hydrocarbon stream which is removed from the operation, and a second stream containing isoprene and acetonitrile, stripping isoprene and unavoidably vaporized acetonitrile from said second stream, washing the vapors of isoprene and acetonitrile thus obtained with water, obtaining an isoprene-containing stream and a water solution of acetonitrile, contacting said water solution with at least a portion of said amylenes-containing stream under conditions of preferential extraction of acetonitrile thereby obtaining an amylenes-containing stream also containing acetonitrile and passing the last obtained stream to said contacting of said first stream with acetonitrile.

2. The recovery of isoprene from an amylenes-containing hydrocarbon first stream which comprises contacting said first stream with an aqueous acetonitrile solution under conditions of extractive distillation to obtain an

*Table I.—Stream compositions in pounds per hour*

| Stream component | 24 | 3 | 6 | 8 | 15 | 12 | 17 | 19 | 18 | 1 | 30 | 17 | 26 | 22 |
|---|---|---|---|---|---|---|---|---|---|---|---|---|---|---|
| 3MB-1 [1] | 5.3 | ------ | 5.2 | 0.1 | 0.1 | ------ | ------ | 0.1 | ------ | 5.3 | ------ | ------ | ------ | 0.1 |
| 2MB-1 [2] | 22.7 | ------ | 22.6 | 0.1 | 0.1 | ------ | ------ | 0.1 | ------ | 22.7 | ------ | ------ | ------ | 0.1 |
| 2MB-2 [3] | 37.0 | ------ | 36.9 | 0.1 | 0.1 | ------ | ------ | 0.1 | ------ | 37.0 | ------ | ------ | ------ | 0.1 |
| Isoprene | 35 | ------ | 0.1 | 34.9 | 34.9 | ------ | ------ | 34.9 | ------ | 35 | ------ | ------ | ------ | 34.9 |
| Acetonitrile | 0 | 700 | 14.2 | 688.4 | 2.6 | 685.8 | ------ | ------ | 2.6 | 2.6 | 14.2 | ------ | ------ | ------ |
| Water | 0 | 119 | 3.5 | 115.7 | 0.2 | 115.5 | 41.4 | 3.0 | 38.6 | 0.2 | 3.5 | 38.4 | 3.0 | ------ |
| Total | 100 | 819 | 82.5 | 838.3 | 38.0 | 801.3 | 41.4 | 38.2 | 41.2 | 102.8 | 17.7 | 38.4 | 3.0 | 35.2 |

[1] 3-methylbutene-1.
[2] 2-methylbutene-1.
[3] 2-methylbutene-2.

In the foregoing example, the amounts given are based upon 100 pounds of fractionated amylenes from a dehydrogenation of hydrocarbons from which $C_5$ cut containing isoprene and amylenes has been taken. The 100 pounds contained approximately 35 pounds of isoprene and 65 pounds of other amylenes. In the water scrubber a vapor-liquid K of 3.4 for acetonitrile was used and in the acetonitrile recovery column, a K of 2 (mole percent acetonitrile in $C_5$ phase (divided) by mole percent acetonitrile in $H_2O$ phase) was used and estimated from activity coefficients.

While acetonitrile is the preferred nitrile for use as selective solvent in this invention, other nitriles may also be employed. These include propionitrile, butyronitrile, and isobutyronitrile.

It will be understood by one skilled in the art in possession of this disclosure, the drawing and the appended claims, that the drawing is a simplified flow diagram and does not purport to show those details of operation and apparatus which one skilled in the art routinely will supply when designing a plant or unit wherein and wherewith to operate the invention. Such details have been omitted for sake of simplicity.

Reasonable variation and modification are possible within the scope of the foregoing disclosure, the drawing and the appended claims to the invention, the essence of which is that acetonitrile can be extracted from water containing the same by contact with a hydrocarbon liquid in which the acetonitrile is preferentially soluble, as described; in one embodiment, the invention comprising further the recovery of purified isoprene by contact with amylenes containing hydrocarbon stream which is removed from the operation, and a second stream containing isoprene and acetonitrile, stripping isoprene and unavoidably vaporized acetonitrile from said second stream, washing the vapors of isoprene and acetonitrile thus obtained with water obtaining an isoprene-containing stream and a water solution of acetonitrile, contacting said water solution with at least a portion of said isoprene-containing stream under conditions of preferential extraction of acetonitrile thereby obtaining a stream containing isoprene and acetonitrile, and then passing the last obtained stream to said contacting of said first stream with acetonitrile.

3. In the recovery of purified isoprene wherein a feed comprising light hydrocarbons capable of preferentially dissolving acetonitrile from water, and containing isoprene is contacted with acetonitrile under first extractive distillation conditions for separating and recovering an isoprene-acetonitrile fraction, said isoprene-acetonitrile fraction is then washed with water to remove the acetonitrile from the isoprene, yielding the purified isoprene, the step which comprises recovering the acetonitrile from the wash water thus used by contacting said wash water containing acetonitrile under second extractive conditions with said feed, and passing said feed fraction of light hydrocarbons containing acetonitrile to said first extractive distillation condition after contacting said feed with said wash water.

4. In the recovery of purified isoprene wherein the purified isoprene is capable of preferentially dissolving acetonitrile from water and a feed containing isoprene is contacted with acetonitrile under first extractive distillation conditions for separating and recovering an isoprene-acetonitrile fraction, said isoprene-acetonitrile fraction is then washed with water to remove the acetonitrile from the isoprene, yielding the purified isoprene, the step which comprises recovering the acetonitrile from the wash water thus used by contacting said wash water under second extractive conditions with at least a portion of said purified isoprene which preferentially dissolves the acetonitrile, and passing said purified isoprene containing acetonitrile to said first extractive distillation condition after contacting said purified isoprene with said wash water.

References Cited by the Examiner

UNITED STATES PATENTS

| | | | |
|---|---|---|---|
| 2,461,346 | 2/1949 | Patterson | 202—39.5 X |
| 2,807,573 | 9/1957 | Robertson | 202—39.5 |
| 2,865,818 | 12/1958 | Hawkins et al. | 202—39.5 |
| 2,971,036 | 2/1961 | James | 202—39.5 X |
| 3,012,947 | 12/1961 | Kelley et al. | 202—39.5 |
| 3,111,547 | 11/1963 | Magness | 202—39.5 X |

NORMAN YUDKOFF, *Primary Examiner.*

GEORGE D. MITCHELL, *Examiner.*